United States Patent [19]

Loveless

[11] 4,422,515

[45] Dec. 27, 1983

[54] MOTORIZED WHEEL CHAIR

[75] Inventor: John H. Loveless, Westminster, Md.

[73] Assignee: Government of the U.S. as represented by Admin. of Veterans Affairs, Washington, D.C.

[21] Appl. No.: 288,197

[22] Filed: Jul. 29, 1981

[51] Int. Cl.³ ............................................. B62D 11/04
[52] U.S. Cl. .............................. 180/6.5; 180/DIG. 3; 280/242 WC; 280/289 WC; 318/139
[58] Field of Search ................. 180/6.5, DIG. 3, 6.24, 180/6.28, 6.48; 280/242 WC, 289 WC, 200, 242 R; 297/DIG. 4; 324/176; 318/139

[56] References Cited

U.S. PATENT DOCUMENTS

| | | | |
|---|---|---|---|
| 3,643,198 | 2/1972 | Economu | 324/176 X |
| 4,050,533 | 9/1977 | Seamone | 180/6.5 |

FOREIGN PATENT DOCUMENTS 2431962  1/1976  Fed. Rep. of Germany ...... 324/176

Primary Examiner—Joseph F. Peters, Jr.
Assistant Examiner—Mitchell J. Hill
Attorney, Agent, or Firm—Browdy and Neimark

[57] ABSTRACT

A wheel chair with independent electric motors for the respective drive wheels. Free wheeling hand rims are journalled outwardly adjacent to and coaxially with the drive wheels. The free wheeling hand rims are connected to respective velocity transducers generating electrical velocity signals which are used to respectively control the speed of the wheel motors. The motor speeds are in proportion to the hand rim velocities. Minimal force is required to rotate the hand rims.

10 Claims, 3 Drawing Figures

MOTORIZED WHEEL CHAIR

FIELD OF THE INVENTION

This invention relates to motorized wheel chairs, and more particularly to a motorized wheel chair having manually operated transducers to control the drive motors of the chair in accordance with the speed of actuation of the transducers.

BACKGROUND OF THE INVENTION

There is a definite need for easily-controllable power-driven wheel chairs for use by non-ambulatory patients. At the present time most of the available power-driven wheel chairs use a joy-stick type of control wherein a single lever is employed to correspondingly control the power drive means of the wheelchair. It has been found that with such a type of control the response and maneuverability of the wheel chair are unsatisfactory, especially in close quarters, due to insufficient sensitivity of the control system and inflexibility of the interface arrangements provided between the joy-stick, or equivalent control element, and the driving structures of the system.

In the previously issued U.S. Pat. No. 4,050,533 to Woodrow Seamone, it is proposed to employ an angular-position transducer incorporated in the coupling system between a hand rim element and a driving wheel, the hand rim element being resiliently coupled to the driving wheel. The transducer is in the form of a potentiometer adjusted in accordance with the amount of manual torque applied to the hand rim element. Upon sensing a change in resistance of the transducer caused by said torque an output is provided causing a desired change in the rotational motion of the driving wheel. In practice it has been found that a motorized wheel chair using this system is very jerky and uneven in operation because when the hand rim element is rotated it works against the torque of the motor until the transducer becomes effective, and because it is difficult to establish the desired new value of resistance adjustment of the potentiometer within a reasonably short time period. In other words, it is not possible to quickly set the transducer to its desired new-resistance position corresponding to that required for the desired new control signal value. Therefore, using merely a change of angular position of the hand rim element as the controlling factor does not appear to be a practical method of providing the required type of wheel chair control. Furthermore, this proposed system requires the patient to employ considerable muscular effort, and many patients do not possess the required strength to exert this effort.

SUMMARY OF THE INVENTION

The present invention overcomes the problems associated with the prior art devices by providing a motorized wheel chair which is used substantially in the same manner as a conventional wheel chair, i.e., the user rotates a pair of rims disposed on opposite sides of the wheel chair. Instead of these rims, or hand rails, being directly fixed to the drive wheels of the wheel chair, they are free wheeling, and very slight amounts of force, applied in exactly the same manner as force would be applied to a non-powered wheel chair, will permit the wheel chair to be maneuvered by the user. Velocity transducers are provided on the free wheeling hand rims, and the velocity at which the hand rims are moved is translated through velocity controller circuitry into drive motion imparted by drive motors to the wheels of the wheel chair. As a result, very minimal effort on the part of the user, in the form of the effort of merely rotating the hand rims, will cause a proportional driving force to be applied to the associated drive wheels of the wheel chair. By employing a separate hand rim and drive motor for each of the two drive wheels of the wheel chair, conventional maneuverability of the wheel chair is maintained, and only minimal effort is required on the part of the user to accomplish directed movement of the wheel chair.

Accordingly, a main object of the invention is to provide an improved motorized wheel chair which overcomes the disadvantages and deficiencies of previously known motorized wheel chairs.

A further object of the invention is to provide an improved motorized wheel chair employing hand rim members movable by minimal manual effort to control and direct the motion of the wheel chair and controlling the speed of the wheel chair driving motors in accordance with the manually imparted rotational speed of the hand rims, so that the wheel chair is highly maneuverable and requires minimal effort on the part of the occupant to control the movement of the wheel chair, even in limited areas.

A still further object of the invention is to provide an improved motorized wheel chair which employs free wheeling hand rims adjacent its drive wheels and velocity transducing systems to translate the rotational velocity of the hand rims into corresponding changes of the driving torque applied to the driving wheels of the wheel chair by the wheel chair motors, the manual actuation of the hand rims by the occupant of the wheel chair being applied exactly in the same manner as in the use of a non-powered wheel chair but requiring much less effort, and enabling the occupant to easily maneuver the wheel chair.

BRIEF DESCRIPTION OF THE DRAWINGS

Further objects and advantages of the invention will become apparent from the following description and claims, and from the accompanying drawings, wherein:

DETAILED DESCRIPTION OF A PREFERRED EMBODIMENT

Figure 1:
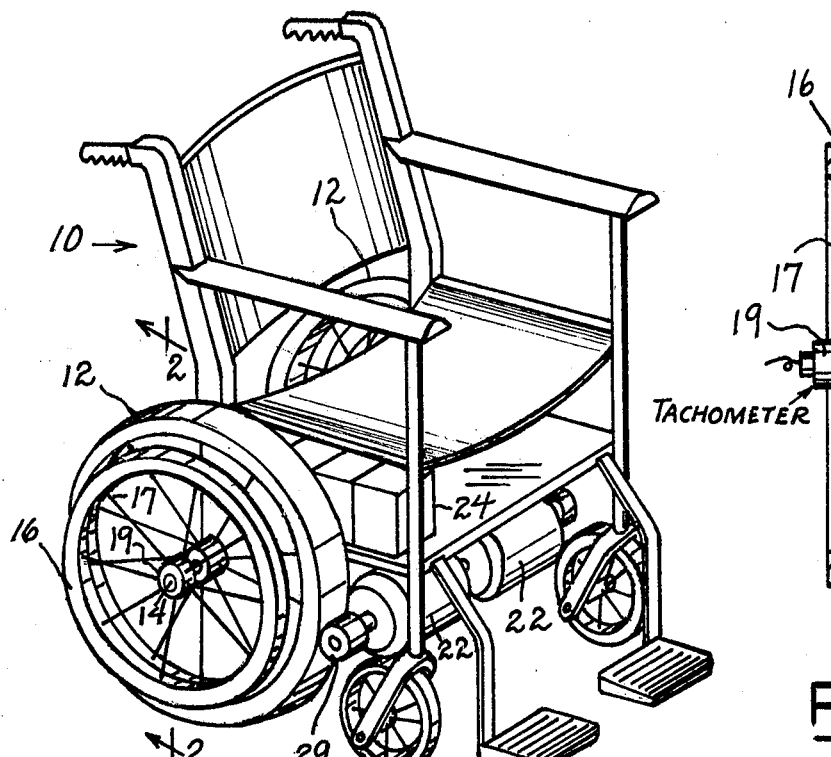
FIG. 1 is a perspective view of a motor-powered wheel chair constructed in accordance with the present invention.
Figure 2:
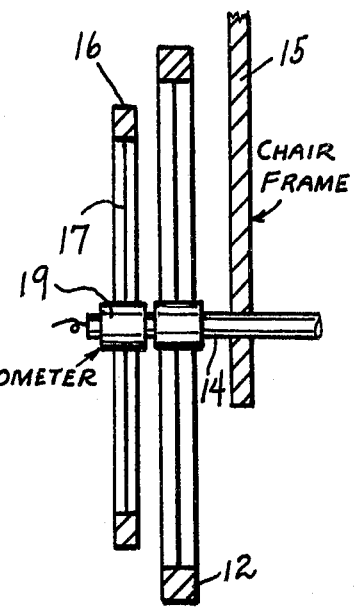
FIG. 2 is an enlarged fragmentary transverse vertical cross-sectional view taken substantially on line 2—2 of FIG. 1.

Referring to the drawings, and more particularly to FIG. 1, there is shown therein a wheel chair 10 incorporating the features and principles of the present invention. The wheel chair is of a conventional design, with the exception of the components hereinafter described. A pair of ground-engaging drive wheels 12 are disposed on either side of the wheel chair 10 and are journalled thereto on an axle 14. The axle 14 may be rigidly connected to the wheel chair frame, as shown in FIG. 2. The wheels 12, being thus journalled to the frame, shown at 15 in FIG. 2, engage the ground, and when driven into rotation, cause the wheel chair to be propelled. A pair of hand rims 16 are rotatably mounted on the axle 14 and are permitted to independently spin on axle 14.

A hand rim velocity sensor assembly 18 includes an electrical tachometer 19 which is located at the hub of the associated hand rim 16. Said hub is connected to the hand rim by radial spokes 17. A velocity sensor assembly 18 is provided on each side of the wheel chair 10. As the hand rim 16 is spun on the axle 14, the direction and velocity of the hand rim are measured by the tachometer 19, which generates a corresponding electrical signal at its output, shown at 27 in FIG. 3. This output signal has a strength and polarity representing the velocity and direction of rotation of the associated hand rim 16.

A suitable power source, such as a battery 24, is provided for driving the associated ground-engaging wheel 12 via a drive motor 22 and a conventional drive wheel direction and velocity-controlling unit 20. The voltage signal at 27 is employed as the controlling command signal for the wheel velocity controller 20.

Figure 3:
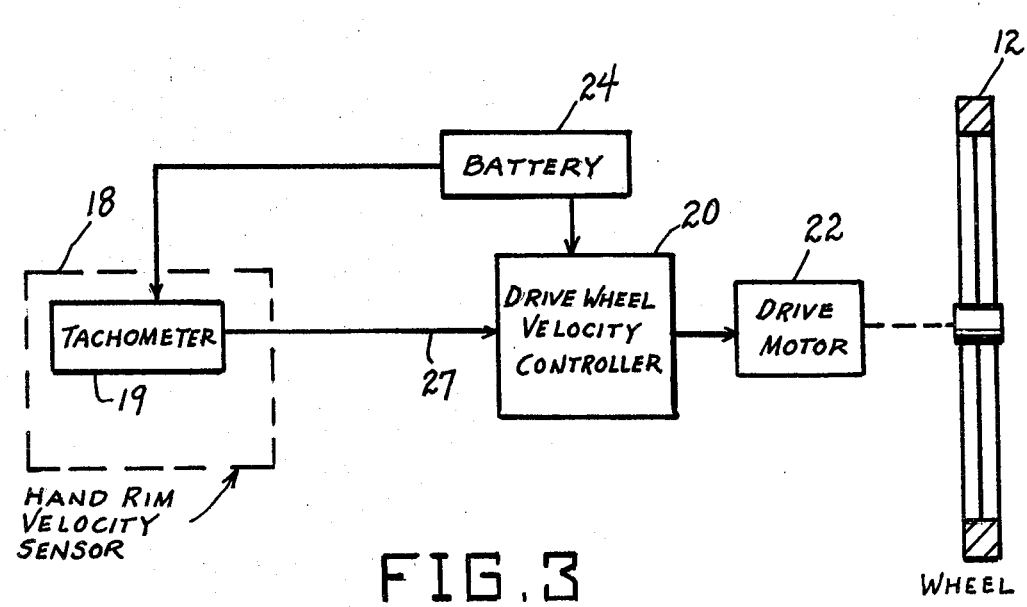
FIG. 3 is a block diagram showing the general electrical circuitry of one side portion of the wheel chair of FIG. 1.

A control system such as is shown in FIG. 3 is provided for each wheel 12. The drive motors 22 are frictionally coupled to the peripheries of the ground-engaging wheels 12 in a conventional manner by friction rollers 29, as shown in FIG. 1.

In operation, the user turns the hand rims 16 in the same manner as he would apply force to the hand rims of a conventional non-powered wheel chair but at a much lower level. The hand rim velocity sensor assembly 18 associated with each hand rim 16 measures the direction and velocity at which the hand rim 16 is turning and translates this into an electrical signal which is employed as a command signal to the associated drive wheel velocity controller 20, which energizes the associated drive motor 22 to provide a proportional velocity of its associated driven wheel 12 and in the direction indicated by the sensor output signal at 27.

It should be apparent that although hand rims 16 are illustrated as being mounted on opposite ends of the axle 14, if so desired the hand rims could both be mounted on the same side of the wheel chair if a patient had use of only one arm. Furthermore, the hand rims could be mounted at other locations on the wheel chair suitable to a patient's individual need.

While a specific embodiment of a motorized wheel chair has been disclosed in the forgoing description, it will be understood that various modifications within the scope of the invention may occur to those skilled in the art. Therefore it is intended that adaptations and modifications should and are intended to be comprehended within the meaning and range of equivalents of the disclosed embodiments.

What is claimed is:

1. In a motorized wheelchair for providing transportation for human passengers, said chair including ground-engaging drive wheels and respective independent electric motors drivingly coupled to the drive wheels, the improvement comprising hand rim means freely journalled on said wheel chair, transducer means comprising means for generating electrical signals responsive to the rotational velocity of said hand rim means relative to said wheel chair, and velocity controller means, connected to and energizing said motor, for controlling the speed of the motors responsive to and in accordance with said electrical signals.

2. The motorized wheel chair of claim 1, and wherein said hand rim means is journalled adjacent to each of said ground-engaging drive wheels.

3. The motorized wheel chair of claim 1, and wherein the hand rim means includes a hub portion and the transducer means is located at said hub portion.

4. The motorized wheel chair of claim 1, and wherein the transducer means further comprises an electrical tachometer mounted on the hand rim means and arranged to generate an electrical output signal in accordance with the rotational velocity of the hand rim means.

5. The motorized wheel chair of claim 4, and wherein said hand rim means has a hub portion including said electrical tachometer.

6. The motorized wheel chair of claim 4, and wherein said output signal is substantially proportional to the rotational velocity of the hand rim means.

7. The motorized wheel chair of claim 4, and wherein the polarity of the output signal is in accordance with the direction of rotation of the hand rim means.

8. The motorized wheel chair of claim 1, and wherein said hand rim means comprises respective hand rim members journalled to the wheel chair substantially coaxially with respect to and adjacent to the ground-engaging drive wheels.

9. The motorized wheel chair of claim 8, and wherein each hand rim member is provided with a hub portion and wherein said transducer means further comprises respective electrical tachometers located at said hub portions.

10. The motorized wheel chair of claim 9, and wherein said wheel chair includes a transverse axle, said ground-engaging drive wheels being journalled on said axle, and wherein said electrical tachometers are mounted to sense rotation relative to said axle.

* * * * *